(12) United States Patent
Handerek et al.

(10) Patent No.: US 11,187,595 B2
(45) Date of Patent: Nov. 30, 2021

(54) DISTRIBUTED OPTICAL TEMPERATURE SENSOR

(71) Applicant: Fotech Group Limited, Fleet (GB)

(72) Inventors: Vincent Handerek, Grays (GB); Alan Yau, Farnborough (GB)

(73) Assignee: Fotech Group Limited, Hampshire (GB)

( * ) Notice: Subject to any disclaimer, the term of this patent is extended or adjusted under 35 U.S.C. 154(b) by 298 days.

(21) Appl. No.: 16/344,218

(22) PCT Filed: Oct. 25, 2017

(86) PCT No.: PCT/GB2017/053214
§ 371 (c)(1),
(2) Date: Apr. 23, 2019

(87) PCT Pub. No.: WO2018/078359
PCT Pub. Date: May 3, 2018

(65) Prior Publication Data
US 2019/0257699 A1    Aug. 22, 2019

(30) Foreign Application Priority Data
Oct. 25, 2016    (GB) ...................................... 1618036

(51) Int. Cl.
*G01K 11/3206* (2021.01)
*G01K 11/32* (2021.01)
(52) U.S. Cl.
CPC .......... *G01K 11/3206* (2013.01); *G01K 11/32* (2013.01)
(58) Field of Classification Search
CPC .......................... G01K 11/3206; G01K 11/32
See application file for complete search history.

(56) References Cited

U.S. PATENT DOCUMENTS

| 5,004,913 A  * | 4/1991 | Kleinerman | .......... | G01J 5/0896 |
| | | | | 250/227.21 |
| 7,504,618 B2 * | 3/2009 | Hartog | ................. | G01J 3/4412 |
| | | | | 250/227.14 |

(Continued)

FOREIGN PATENT DOCUMENTS

| EP | 0272466 A2 | 6/1988 |
| GB | 2515564 A | 12/2014 |

(Continued)

OTHER PUBLICATIONS

European Patent Office, International Search Report in International Patent Application No. PCT/GB2017/053214, 3 pp. (dated Dec. 20, 2017).

(Continued)

*Primary Examiner* — Nathaniel T Woodward
*Assistant Examiner* — Philip L Cotey
(74) *Attorney, Agent, or Firm* — Leydig Voit & Mayer, Ltd.

(57) ABSTRACT

Methods and apparatus are disclosed for detecting a rate of change of temperature in the environment around a sensing optical fibre at a position along the fibre, in which a time varying coherent Rayleigh backscatter interference signal is detected using probe light backscattered within the sensing fibre from the position. A spectral density profile is calculated which represents frequency components in time variations of the interference signal. One or more properties of a feature of the spectral density profile are then used to determine the rate of change of temperature. The feature may be, for example, a decline in the spectral density profile with increasing frequency, or a peak in the spectral density profile.

30 Claims, 10 Drawing Sheets

(56) References Cited

U.S. PATENT DOCUMENTS

| | | | |
|---|---|---|---|
| 8,810,796 B2* | 8/2014 | Hays | G01S 17/003 |
| | | | 356/450 |
| 8,811,777 B2* | 8/2014 | Younge | A61B 5/6852 |
| | | | 385/13 |
| 2009/0008536 A1* | 1/2009 | Hartog | G01J 3/4412 |
| | | | 250/227.14 |
| 2012/0250722 A1* | 10/2012 | Barfoot | G08B 17/06 |
| | | | 374/1 |
| 2013/0113629 A1* | 5/2013 | Hartog | G01D 5/35303 |
| | | | 340/853.2 |
| 2016/0123798 A1* | 5/2016 | Godfrey | G01D 5/35361 |
| | | | 73/643 |
| 2017/0045410 A1* | 2/2017 | Crickmore | G01M 3/047 |
| 2017/0074688 A1* | 3/2017 | Crickmore | G01K 11/3206 |

FOREIGN PATENT DOCUMENTS

| | | |
|---|---|---|
| WO | WO 2006/048647 A2 | 5/2006 |
| WO | WO 2008/056143 A1 | 5/2008 |
| WO | WO 2012/063066 A2 | 5/2012 |
| WO | WO 2012/076873 A2 | 6/2012 |
| WO | WO 2015/076976 A1 | 5/2015 |
| WO | WO 2015/170116 A1 | 11/2015 |
| WO | WO 2016/174410 A1 | 11/2016 |

OTHER PUBLICATIONS

United Kingdom Intellectual Property Office, Search Report in United Kingdom Patent Application No. GB1618036.6, 1 p. (dated Jan. 26, 2017).

* cited by examiner

DISTRIBUTED OPTICAL TEMPERATURE SENSOR

CROSS-REFERENCE TO RELATED APPLICATIONS

This application is a national phase application of International Patent Application No. PCT/GB2017/053214, filed Oct. 25, 2017, which claims priority to British Patent Application No. GB 1618036.6, filed Oct. 25, 2016, both of which are incorporated by reference herein in their entireties for all purposes.

The present disclosure relates to a distributed optical fibre sensor arranged to detect changes in temperature. For example, the distributed optical fibre sensor may be an optical time domain reflectometry (OTDR) sensor arranged to detect a coherent Rayleigh backscatter interference signal from multiple locations along a sensing optical fibre, and use the signal to detect rates of change of temperature in the environment of the sensing optical fibre in those locations.

INTRODUCTION

Distributed optical fibre sensing is a well known approach to providing information about environmental conditions surrounding a sensing optical fibre. Fully-distributed sensing in principle provides spatially resolved information from every point along the fibre. Variables that can be sensed include temperature, static strain, pressure, and vibration.

One such technique detects variations in optical path length, induced by forcings such as vibration, strain, and temperature in the coherent Rayleigh backscatter interference profile of light backscattered within a sensing optical fibre interrogated by an optical source of limited bandwidth. Such Rayleigh backscatter interference profiles arise from interference between the many components of the backscattered light originating from different points along a portion of the sensing optical fibre illuminated by the optical source. Such techniques are described, for example, in WO2008/056143.

Temperature sensing using a distributed optical fibre sensor is discussed, for example, in WO2015/076976, which suggests that by using the phase of low frequency components in the interference signal, temperature changes can be estimated with higher precision than is possible with conventional distributed temperature sensing. In particular, this document proposes that long period fringes of the interference signal may be converted into interferometer phase data by taking a Hilbert transform and unwrapping its complex phase.

It would be desirable to address problems and limitations of the related prior art.

SUMMARY OF THE INVENTION

The invention provides methods and apparatus for determining a rate of change of temperature in the environment of a sensing optical fibre by detecting properties of a low frequency continuum in a spectral density profile of coherent Rayleigh backscatter in the sensing optical fibre. For example, the rate of change of temperature may be determined from the position of an edge of, or decline in, the low frequency continuum, or where the low frequency continuum falls below a threshold level. Such a low frequency continuum may be seen for example when coherent probe light pulses each having a single peak structure are used for interrogating the sensing optical fibre.

Where probe light pulses of other forms and shapes are used, other features of the spectral density profile of the coherent Rayleigh backscatter may become apparent and be used for determining a rate of change of temperature. For example, probe light pulses having two sections of higher intensity (which are still sufficiently coherent with each other, so as to give rise to mutual interference in the coherent Rayleigh noise) are separated by a section of lower (or substantially zero) intensity, a frequency peak may be seen in the spectral density profile, the frequency position of this peak in the spectral density profile representing the rate of change of temperature in the environment of the sensing optical fibre.

The invention therefore also provides methods and apparatus for determining a rate of change of temperature in the environment of an optical fibre by detecting properties, such as the position, of a peak in a spectral density profile of coherent Rayleigh backscatter in the optical fibre, resulting from probe light pulses each having two intensity peaks coherent with each other.

Aspects of the invention provide a method of detecting a rate of change of temperature in the environment of a sensing optical fibre, comprising: delivering probe light pulses into a sensing optical fibre disposed within the environment; and for each of a plurality of positions along the sensing optical fibre: detecting a time varying coherent Rayleigh backscatter interference signal from probe light backscattered within the sensing fibre from the associated position; calculating a spectral density profile of the time varying coherent Rayleigh backscatter interference signal, the spectral density profile representing frequency components in the time variations of the coherent Rayleigh backscatter interference signal at that position; detecting one or more properties of a feature (such as a decline or peak) in the spectral density profile as a function of frequency (that is with increasing or decreasing frequency of the frequency components); and determining a rate of change of temperature in the environment of the sensing optical fibre at that position from the one or more properties of the feature. If the feature is a decline in the spectral density profile with increasing frequency, then properties of the decline may similarly be described as properties of a shoulder, a boundary, a slope, or a contour of the spectral density profile. The detected one or more properties may in particular be a position (that is a frequency value) of the decline, peak, or other feature within the spectral density profile.

Detecting one or more properties of the feature may similarly be described as detecting properties of an envelope of the coherent Rayleigh backscatter signal. In particular, where the feature is a decline, this may be a decline in a continuum of the signal which extends from the DC position or end of the frequency scale. For example, the continuum may be described as a DC peak in the spectral density, with the flank of that peak declining with increasing frequency. The envelope to be detected is then an envelope or boundary or contour of the DC peak. Note that in order to determine such an envelope, boundary or contour, it is not necessarily required to determine a DC value of the spectral density.

The spectral density profile may express a power spectral density, an energy spectral density, a spectral amplitude, or may be expressed in other forms.

As discussed below, temperature changes in the environment around the optical fibre, and therefore in the fibre itself, may give rise to a low frequency spectral continuum which declines with increasing frequency so as to define a decline (or equivalently a shoulder or slope) having one or more characteristics such as a rate of decline, a position of the decline, or an edge, boundary or contour according to a condition such as a threshold or similar, which indicate the rate of change of temperature. Detecting properties of the decline in the spectral density profile may therefore comprise detecting properties of a decline in a low frequency spectral continuum of the spectral density profile.

Whether the feature is a decline, a peak, some other feature, or combination of features, detecting the feature in the spectral density profile may comprise determining one or more function parameters of a detection function applied to the spectral density profile, and determining the rate of change of temperature from the one or more determined function parameters. For example, the detection function may comprise a threshold function for which a said function parameter specifies a frequency at which the spectral density profile declines past a threshold spectral density level, or may comprise a peak shaped function from which a position of the peak, or some more direct measure of the desired temperature change parameter, can be determined.

In some embodiments where a decline is detected, the threshold spectral density level may be one or more of: a predetermined spectral density value; a spectral density value which is a predetermined fraction or proportion of the DC spectral density in the same spectral density profile; a spectral density value calculated from the same spectral density profile; and a spectral density value calculated from a plurality of spectral density profiles. In one particular example described below the threshold is set as 2% of the DC level of the same spectral density profile, but other threshold levels for example in the range 30% down to 0.1% could be used.

In other embodiments, detecting the decline or other feature in the spectral density profile may comprise fitting the detection function to the spectral density profile to determine said one or more function parameters. For example, the detection function may be a curve such as a smooth algebraic function suitable for fitting to a low frequency spectral continuum of the spectral density profile, or to the expected peak distinct from a DC or other low frequency signal close to DC.

The calculated spectral density profile may, for example, include frequency components in the time varying coherent Rayleigh backscatter interference signal comprising at least frequencies in a range from 1 Hz to 10 Hz, 1 Hz to 30 Hz, or 1 Hz to 100 Hz. A peak, decline, or other feature as discussed above may therefore be sought in these ranges or other appropriate ranges.

The detected one or more properties of a feature in the spectral density profile may comprise a detected frequency in any of the same ranges. The determined rate of change of temperature may then be determined as proportional or otherwise functionally related to the detected frequency.

The method may be repeated for a plurality of sequential time periods, for example with one or more of calculation of a spectral density profile, detecting of one or more properties of a feature in the spectral density profile, and determining a rate of change of temperature, being repeated for one or more of said plurality of positions at a rate of at least once every 10 seconds, or at least once every 60 seconds.

The invention also provides corresponding apparatus, for example apparatus for detecting a rate of change of temperature in the environment of a sensing optical fibre, comprising: a sensing optical fibre disposed in the environment; a probe light source arranged to deliver probe light pulses into the sensing optical fibre; a detector arranged to detect a time varying coherent Rayleigh backscatter interference signal for each of a plurality of positions along the sensing optical fibre from probe light backscattered within the sensing fibre from the corresponding positions; and an analyser arranged carry out the steps of calculating a spectral density profile, detecting one or more properties of a decline of the profile with increasing frequency, such as a boundary, contour or slope, or properties of another feature such as a peak, and determining a rate of change of temperature as set out above and elsewhere in this document.

The process steps carried out by the analyser may be carried out by suitable computer program elements executing on suitable computer apparatus, typically comprising at least an input to accept the coherent Rayleigh backscatter interference signal, suitable computer processor and memory elements, and an output to deliver the described rate of change of temperature or data derived from such a rate. The invention therefore also provides such computer program elements, and such computer program elements provided on one or more computer readable media.

BRIEF SUMMARY OF THE DRAWINGS

Embodiments of the invention will now be described, by way of example only, with reference to the accompanying drawings of which:

FIG. 3b plots a threshold frequency determined from the spectral density profiles of FIG. 3 against a thermocouple detected rate of change of temperature in the experiment of FIGS. 2 and 3a;

FIG. 5 illustrates techniques for detecting one or more properties in a decline, or in other variations a peak or other feature, in the spectral density profiles for example as illustrated in FIG. 3a;

DETAILED DESCRIPTION OF EMBODIMENTS

Figure 1:
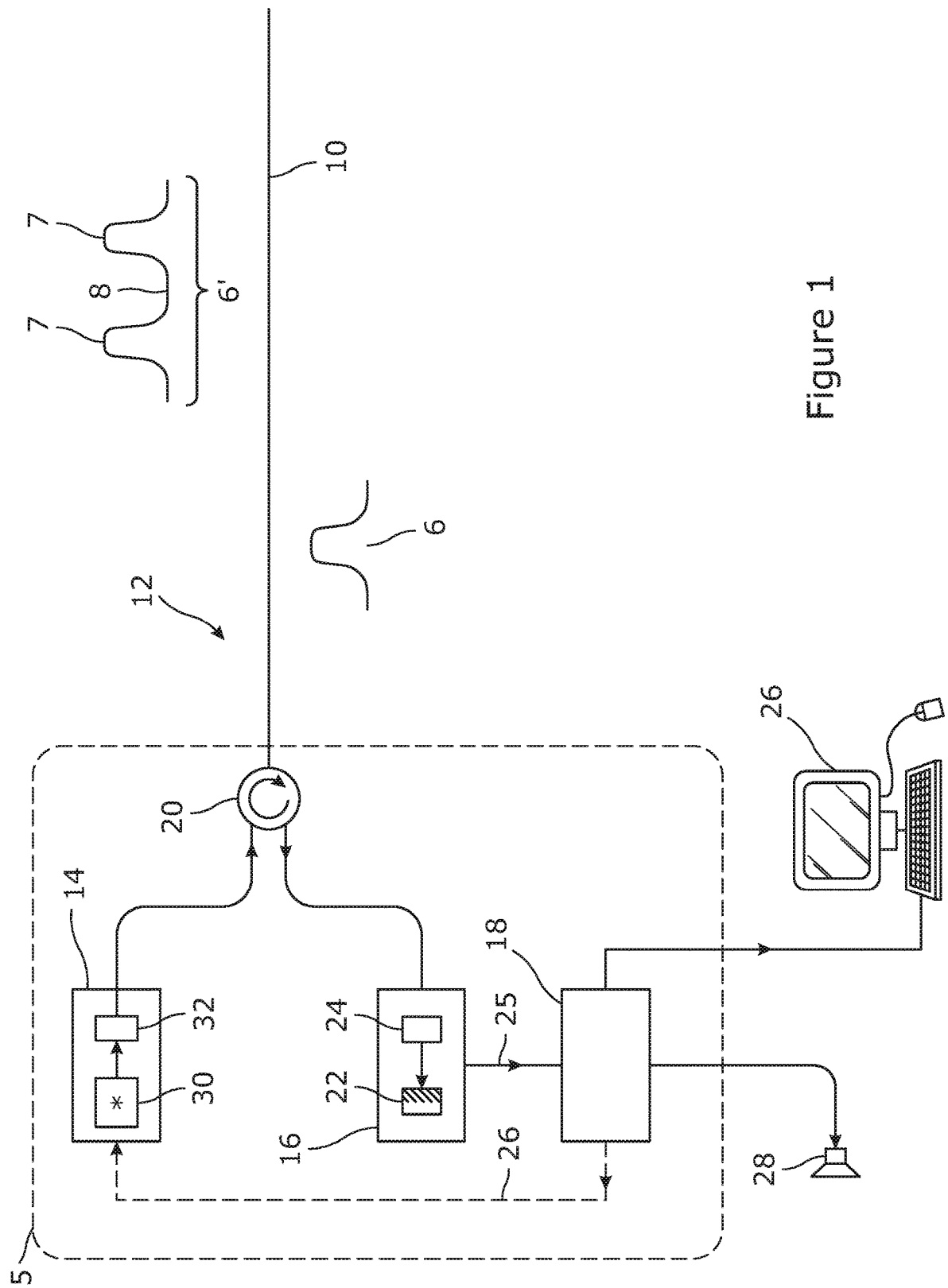
FIG. 1 schematically illustrates a fibre optic sensor embodying the invention.

Referring to FIG. 1 there is illustrated a distributed optical fibre sensor arranged to sense a rate of change of temperature in an environment 12 of a sensing optical fibre 10, as a function of position along part or all of the sensing optical fibre, using optical time domain reflectometry, or another reflectometry technique. An interrogator unit 5 of the sensor includes a probe light source 14 for generating probe light pulses 6, 6' of suitable timings, shapes and wavelengths, an optical detector 16 for detecting probe light resulting from the probe light pulses 6, 6' being backscattered within the sensing fibre 10, and an analyser 18 for processing data representing properties of the backscattered and detected light which have been received at the detector.

The probe light source 14 forms probe light pulses 6, 6', each pulse having an optical wavelength. The probe light pulses are forwarded to an optical circulator 20 and from there on to the sensing optical fibre 10 which passes through the environment 12 of the sensing optical fibre.

Probe light which has been Rayleigh backscattered within the sensing optical fibre 10 is received at the circulator 20 which passes the collected light on to the detector 16, which comprises a detector element 22. The detector element may comprise, for example, one or more suitable photodiodes. The backscattered light may be conditioned in the detector using one or more detector optical conditioning components 24. The detector 16 then passes a detected interference signal 25 corresponding to the detected backscattered probe light to the analyser 18.

The analyser 18 generates and outputs analysis results such as a determination of rate of change of temperature in the environment 12 as a function of position along the sensing optical fibre, the detection of an event in the environment 12 of the sensing optical fibre 10 based on such temperature determination, and/or other results, on the basis of the signal 25 received from the detector 16. In FIG. 1 this output is passed to a computer display 26, although various other types of output mechanism may be used, for example one or more visible or audible alarms 28 which are operated when certain conditions are met in respect of the detected environment of the sensing optical fibre 10, such as detection of a particular rate of temperature change or total temperature change.

The analyser 18 may also use data derived from the detected backscatter signal 25 to provide control signals 26 to the probe light source 14. A variety of control signals may be provided, including signals controlling the durations, timings and wavelengths of probe light pulses, as required. In alternative embodiments, the control functions may be implemented separately to the analyser 18, for example in a separate controller element (not shown in the figure).

The probe light source contains one or more laser sources 30 to generate the probe light pulses 6, 6'. The probe light pulses are conditioned in the probe light source by one or more source optical conditioning components 32.

The sensor can be used to interrogate multiple sensing optical fibres in parallel, and/or in two directions around a loop of sensing fibre, using probe light pulses 6 of different wavelengths, as described in WO2012/076873, which is hereby incorporated by reference for all purposes. Various other arrangements and configurations of the sensor may be employed as will be familiar to the person skilled in the art.

The sensor may be operated using phase-sensitive optical time domain reflectometry (PS-OTDR) in which probe light pulses are used which are each sufficiently coherent that the detected backscatter signal contains or is dominated by self-interference between different parts of the same pulse 6, 6'. Such techniques are discussed which may be used in implementations of the present invention are described in WO2006/048647, WO2008/056143 and WO2012/063066 which are hereby incorporated by reference for all purposes. The resulting coherent Rayleigh backscatter leads to a temporal speckle pattern of interference fringes at the detector, which leads to the detector outputting a coherent Rayleigh backscatter interference signal 25. This signal from the detector then represents, for each probe light pulse, a time series of intensity of the detected coherent Rayleigh backscatter interference. Typical lengths of the probe light pulses 6 may be about 100 ns, to provide a spatial resolution along the sensing optical fibre of about 10 m, although other pulse lengths for example in the range 20 ns-500 ns could be used.

In some embodiments, each probe light pulse or at least each of some of the probe light pulses, is formed as a double peaked pulse 6', although various other pulse shapes may be used. Each double peaked pulse comprises at least two sections 7 which are of higher intensity, and which are separated from each other by another section or other sections of lower or substantially zero intensity 8. Such double peaked pulses 6' and related techniques for use in embodiments of the present invention to provide the probe light pulses and coherent Rayleigh backscatter interference signal of embodiments of the present invention, are described in more detail in WO2006/048647, the contents of which are incorporated herein in their entirety.

Preferably the whole of the double peaked pulse 6', but at least the two sections of higher intensity 7, is/are substantially coherent, so that reflections in a sensing optical fibre of the two sections of higher intensity 7 interfere with each other at the optical detector 16. For example, each double peaked pulse 6' could have a total duration of about 100 ns, similar to that which may be used for a single peaked pulse 6, and providing a spatial resolution of about 10 m in position along the sensing optical fibre, or more generally between about 20 ns and 500 ns, or between about 30 ns and 200 ns.

Typically each peak of the double peaked pulse 6' may occupy about 5% to 40% of the duration of the pulse, with the two peaks being of similar intensity (say within 10% of each other) and the remaining section of low intensity between the peaks having an intensity of less than 30%, or more preferably less than 10% of the intensity at each peak. It is not necessary for both peaks to be the same length or the same peak intensity, although using peaks of relatively constant intensity (i.e. flat topped more than rounded) may be advantageous.

Of course other parameters could be used for example each peak occupying between 3% and 30% of the duration of the pulse. In other terms, the full width at half maximum of each peak may each be less than 20% of the total pulse duration, and the section of lower intensity may be of an intensity less than the half maximum of both peaks.

In order to sense changes over time at a particular position along the sensing optical fibre, the temporal development of the interference signal, for a particular round trip time delay for travel of a probe light pulse which corresponds to that position, may be followed over a series of probe light pulses. The round trip time to the end and back to the detector for a 1000 metre long sensing fibre is about 10 microseconds, so that a pulse repeat rate of up to about 100 kHz can easily be used if required, although much lower pulse rates may be used, depending on the upper bounds of the frequency range of a disturbance signal to be detected.

The form of the coherent Rayleigh backscatter interference signal 25 arising from a single probe light pulse 6, 6' arises partly from refractive index variations along the sensing optical fibre. Such refractive index variations will be partly due to inherent variations arising from manufacture and installation of the fibre. However, the refractive index at any particular location will also vary over time due to environmental effects, in particular local changes in the temperature of the optical fibre. The form of the coherent Rayleigh backscatter interference signal also changes as the physical length and therefore also the optical length of a particular portion of the fibre changes, which will typically be at least partly be due to thermal expansion and contraction of the fibre itself, but may also partly be due to thermally induced strain imposed or constrained by the mechanical mounting of the optical fibre, some of which may also be caused by thermal expansion and contraction.

The described sensor may therefore particularly be used to detect changes in temperature at the sensing optical fibre 10 and therefore in the environment around the sensing optical fibre 10. As the temperature of the sensing optical fibre 10 changes at a particular location, intrinsic thermo-optic effects and local expansion/contraction cause slow changes in local optical path length giving rise to changes in the coherent Rayleigh backscatter. In a segment of bare silica fibre of length L, a temperature change ΔT will produce an increment in phase Δφ according to equation 1:

$$\Delta\varphi/\Delta TL = \sim 10^2 \text{ (Units Radians/Kelvin-Metre)} \quad (1)$$

Because of the interferometric nature of coherent Rayleigh backscatter, a gradual change in local optical path length produced by a gradual change in temperature produces a cyclic response in the optical power of the coherent Rayleigh backscatter interference signal corresponding to that location, as the phase change corresponding to the change in optical path length cycles through multiples of 2π. A given rate of change of temperature therefore produces a characteristic frequency in the received signal. For example, if the temperature changes at the rate of dT/dt=1 K/s, a probe light pulse having a physical length in the sensor fibre of about 1 metre will undergo a rate of phase change of about 100 radians/second, which corresponds to a frequency of approximately 16 Hz. The approximate maximum frequency of intensity changes in the coherent Rayleigh backscatter interference signal for a particular location due to a temperature change may be written as:

$$f = \frac{1000}{2\pi} \frac{dT}{dt} \quad (2)$$

so that $f \approx 0.159R$ (units of Hz)  (3)

where R is the temperature drift rate in mK/s.

One way of detecting a gradual change in temperature at the sensing optical fibre could therefore be to isolate and measure the frequency and/or phase of a particular frequency component of the coherent Rayleigh noise which is thought to be directly caused by such changes. However, it is likely to be difficult in most circumstances to uniquely identify such a frequency component from the spectrally broad and typically noisy and highly varying coherent Rayleigh backscatter interference signal, and anyway as the temperature change varies in rate, the frequency and phase of such a component may be difficult to track reliably, if possible at all. The present disclosure therefore proposes alternative techniques for determining a rate of change of temperature from a coherent Rayleigh backscatter interference signal collected using an apparatus such as that of FIG. 1.

Figure 2:
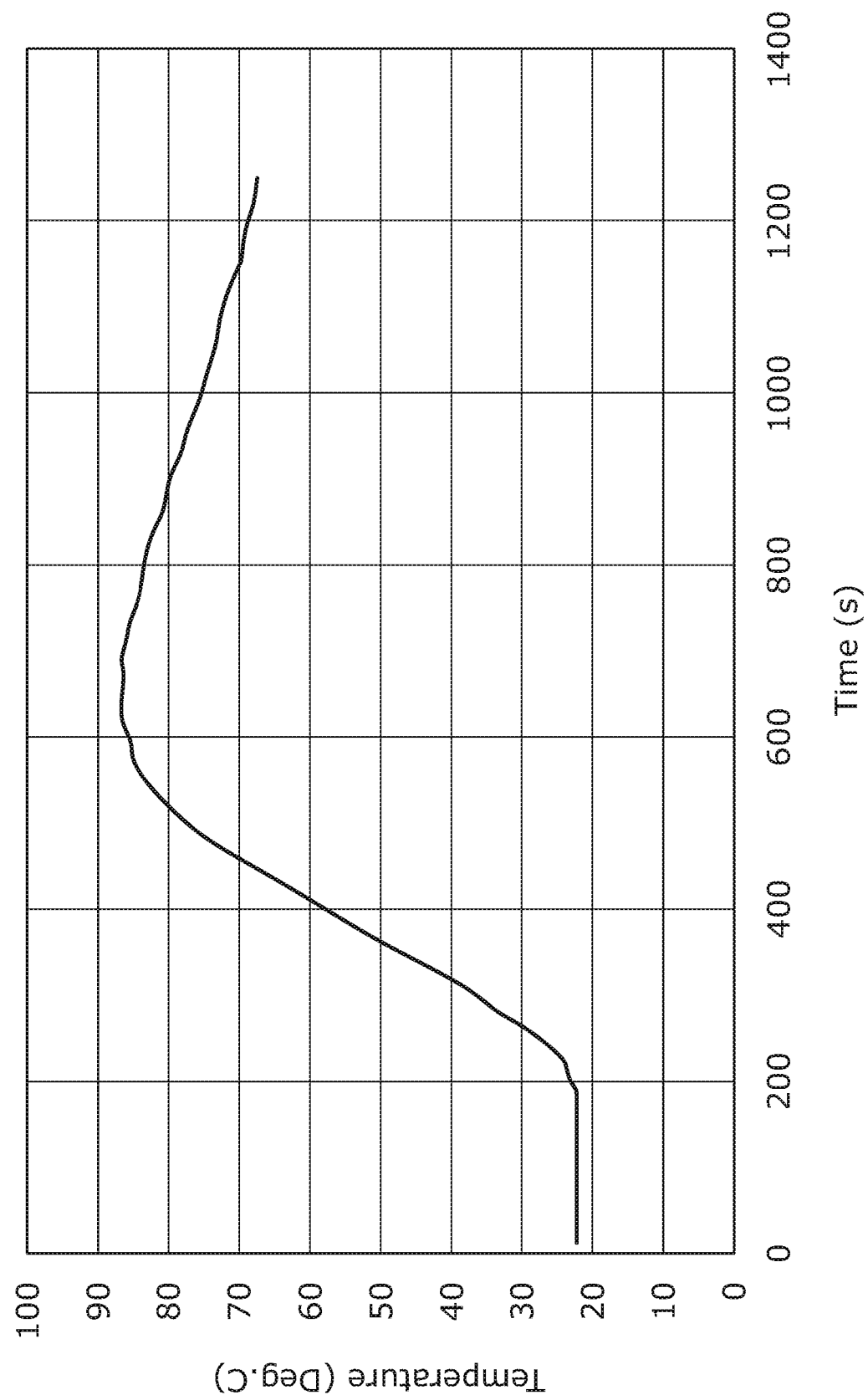
FIG. 2 shows a temperature profile used in an experiment for determining a rate of change of temperature using the sensor of FIG. 1.

In an experiment, the sensing optical fibre 10 of FIG. 1 included a coil of 20 metres of optical fibre which was subjected to the temperature cycle shown in FIG. 2 using a water bath. Starting from an ambient temperature of about 22° Celsius, an approximately constant heating rate of about 0.2° Celsius per second was followed by an approximately constant cooling rate of about 0.04° Celsius per second. During the heating and cooling, cycle probe light pulses 6 each having a single intensity peak and of 100 nanosecond duration (corresponding to a physical length in the fibre of about 10 metres) and 1 kHz repetition rate were used to probe the sensing optical fibre. During the experiment the coil of fibre remained loose and nominally strain free.

Figure 3A:
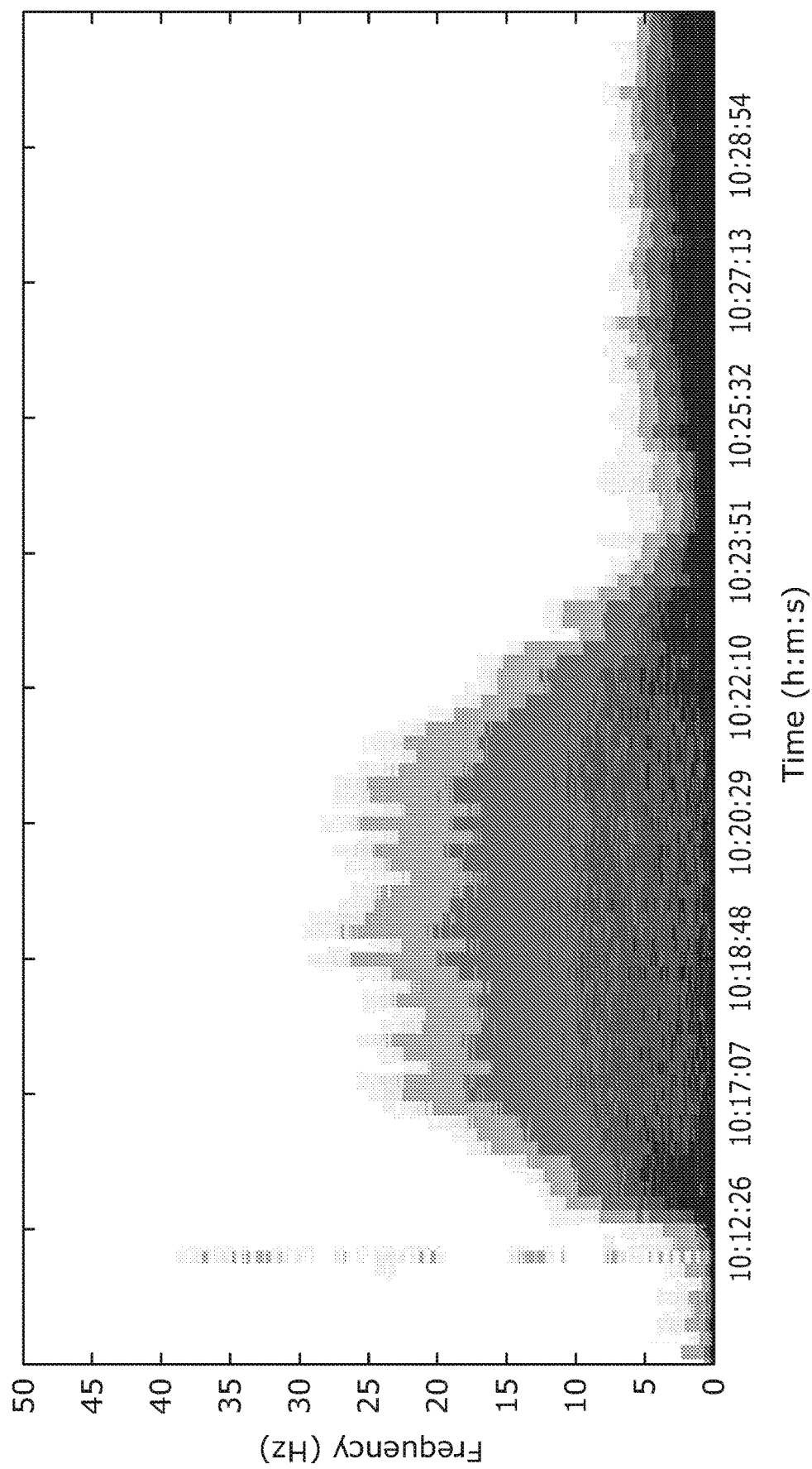
FIG. 3a shows a series of spectral density profiles assembled as a power spectral density graph from the experiment of FIG. 2.

The coherent Rayleigh backscatter interference signal output by the detector 16 over the heating and cooling cycle is shown in FIG. 3a. This plot takes the form of an spectrogram in which time over a total interval of about fifteen minutes provides the abscissa, and power spectral density corresponding to frequency components of the detected coherent Rayleigh backscatter interference signal provides the ordinate. The spectrogram therefore comprises a series of spectral density profiles 40, each such profile being calculated from coherent Rayleigh backscatter detected in a corresponding time window.

Since the repetition rate of probe light pulses used in the experiment is about 1 kHz, the detector signal for each time slot corresponding to a particular location of the sensing fibre was averaged or downsampled to a repetition rate of about 200 Hz, before using a 2048 point fast Fourier transform (FFT) to achieve output with frequency bin resolution of about 0.1 Hz from DC upwards. The power spectral density at the downsampled rate of 200 Hz was then averaged over time bins of about 10 seconds to produce the data plotted in FIG. 3a.

It can be seen from FIG. 3a that the characteristics of the power spectral density corresponding to the imposed gradual temperature change of FIG. 2 takes the form of a low frequency spectral continuum, the spectral density declining with increasing frequency over a range which corresponds broadly to the proposed rate of change of temperature for the experiment as shown in FIG. 2. This is contrary to the single frequency of response to the temperature change which might be expected from a trivial consideration of equations (1) to (3) above. The spectral continuum seen in the data of FIG. 3a makes it difficult to identify and track a single frequency component from which a corresponding temperature change can be determined.

Figure 3B:
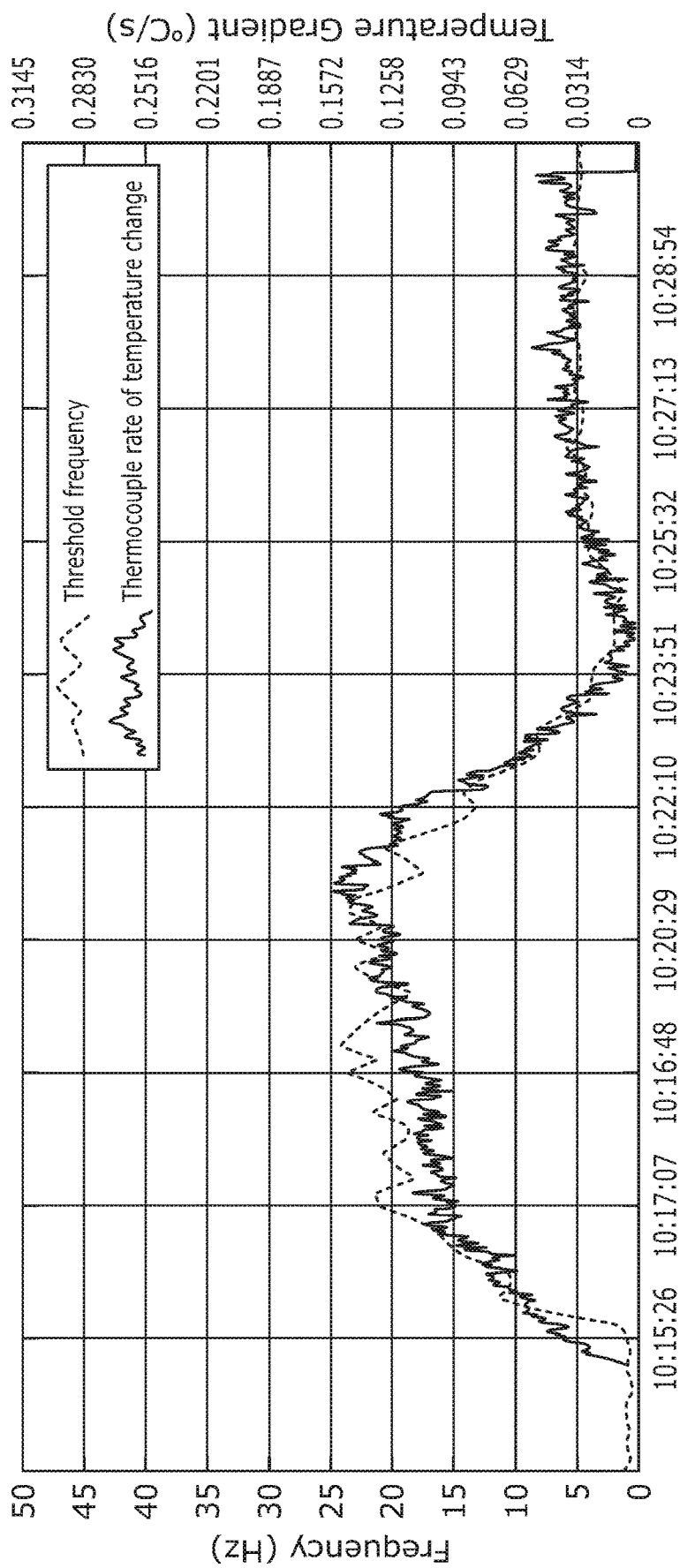

Instead, FIG. 3b provides, as a more slowly varying line, the frequency in Hz at which the power spectral density for each 10 second time window has declined to 2% of the power in the DC frequency component for that time window. For comparison, the more rapidly varying line shows the actual rate of change of temperature in the water bath at the fibre coil as determined by a local and suitably calibrated thermocouple. It can be seen that this example 2% threshold of power spectral density frequency follows the form of the curve representing rate of change of temperature reasonably well, subject to a suitable linear scaling, and is relatively easy and reliable to calculate from the coherent Rayleigh backscatter interference signal, without having to identify or track the frequency or phase of particular individual frequency components which might be thought to result from to a gradual temperature change.

Of course, various other thresholds and other ways of detecting and characterizing the decline in spectral density can be used in order to determine a rate of change of temperature from the spectral density data, and the decline could instead be referred to as a shoulder, a slope, a boundary, a contour, or in other ways, for example by determining an envelope or boundary of the shoulder or DC peak as discussed below. Various ways in which this aspect of the invention may be implemented are illustrated in general terms in FIG. 4. In step 50 of FIG. 4 a raw coherent Rayleigh backscatter interference signal is detected, and in step 52 one or more signal conditioning steps are carried out on the raw signal. These steps may typically include time domain processing of the data so that interference signal data corresponding to each of one or more particular spatial locations along the sensing optical fibre is grouped to form a time series for that location using optical time domain reflectometer principles. A spatial location for these purposes could be a small segment of the fibre, for example a segment which is of similar length to the physical length of a probe light pulse within the fibre which therefore represents a segment length around the lower limit of the detection resolution of the sensor, or the interference signal could be integrated over longer time periods to detect a interference signal corresponding to each of one or more longer segments of the fibre with better signal to noise characteristics but lower spatial resolution.

As well as forming a time series interference signal for a particular spatial location, the data may be conditioned in other ways, for example by downsampling the data by averaging, integrating or otherwise reducing the number of time points as mentioned above, while retaining sufficient time resolution to detect frequency components above the expected frequencies of signals induced by temperature changes, for example to detect frequency components with frequencies of at least 30 Hz to give scope for detecting temperature drifts of up to about 150 mK/s.

At step 54 a spectral density profile 40 is determined for each of one or more particular spatial locations and each of one or more time windows at each such location. Typically a spectral transform such as a fast Fourier transform or other Fourier transform may be used for each of a plurality of time based windows onto the conditioned data output by step 52, to generate a spectral density profile for each such time window. However, other spectral transforms familiar to the person skilled in the art could instead or also be used.

In this way, each spectral density profile 40 represents a profile of spectral density over a frequency range of signals found in the time series of conditioned backscatter data for a particular spatial location of the sensing optical fibre and a particular time window. The time windows may typically be adjacent and non-overlapping, for example each lasting for a time period in a range from about 10 seconds to 120 seconds. The length of the time windows may be chosen in order to provide sufficient signal to noise ratio, and/or for convenience of use in terms of detecting temperature changes on a suitable scale corresponding to the application area. Each time window may be defined using a Hanning window or similar, but other profiles over time could be used such as a Gaussian window, and successive windows may overlap if desired.

The output of step 54 may be one or more power spectral density profiles (i.e. power spectra), but spectral density data in other forms may be provided as well or instead, for example energy spectral density (energy spectra), amplitude of the spectral transform (and in particular the real part of the transform representing intensity rather than phase). Each calculated spectral density profile should cover a frequency range suitable for detecting properties of the decline in the spectral density profile 40 which are attributable to temperature changes, for example covering a range of or within, for example, DC, 0.1 Hz, or 1 Hz, through to, for example, 10 Hz, 30 Hz, or 100 Hz, with a suitable range with such or similar endpoints being used as required.

Figure 5:
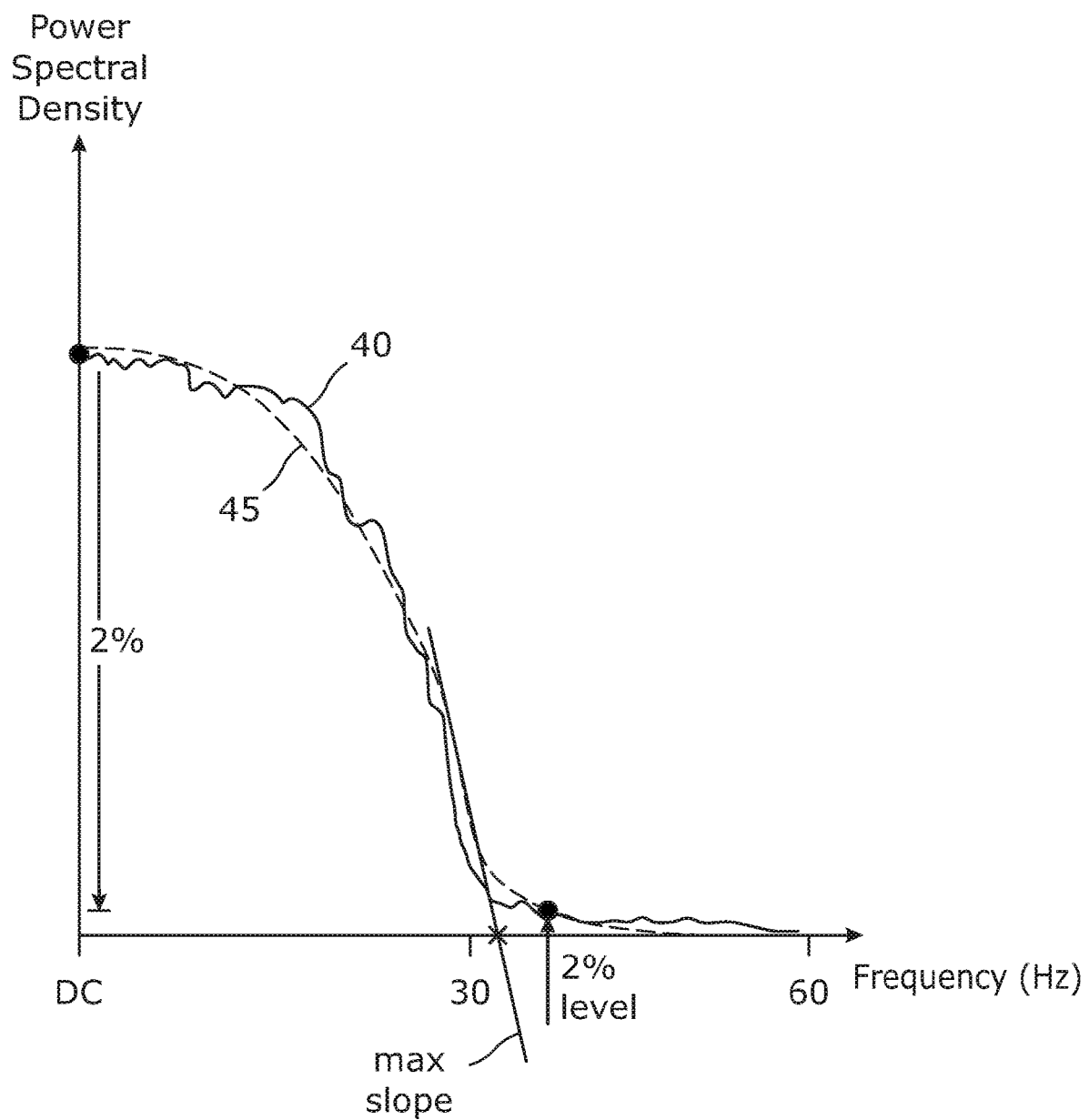

Having calculated a spectral density profile 40 from the backscatter data for a particular spatial location and time window, step 56 represents the process of detecting one or more properties of a decline (or similarly a shoulder, boundary, slope or contour) in the spectral density profile 40 with increasing frequency, for example from a decline in a low frequency spectral continuum as illustrated in FIG. 3a, so that such properties can subsequently be used to determine a corresponding rate of change of temperature at the spatial location and time window. FIG. 5 illustrates two exemplary ways in which this may be achieved. In particular, the solid curve represents a spectral density profile 40 for a particular location along the sensing optical fibre and a particular time window, having been calculated over a range of frequency bins from DC to about 60 Hz. The ordinate units of power spectral density (PSD) are arbitrary.

According to a first scheme, as already illustrated in FIG. 3b, the PSD level in the DC bin (labelled as "DC level") is used to set a threshold, in this case a predetermined and fixed 2% of the DC level, and the position where the spectral density falls past this level sets a frequency, in this case about 30 Hz, which is then a property of the decline used to calculate the rate of change of temperature at particular location.

According to a second scheme illustrated in FIG. 5, the spectral density profile is fitted to a fitting function or curve 45 (broken line) of which one or more fitting parameters can be used to calculate a frequency value, or for more directly calculating rate of change of temperature. In this case, a fit of the fitting function 45 to the spectral density profile 40 is used to determine a maximum gradient of the decline in the low frequency spectral continuum, for example using a smooth fitting function 45 which approximates a typical or expected shape of the decline, or using heavy filtering in frequency. An intersect between a tangent to the point of maximum gradient and the abscissa is then used to determine a frequency value which can be used as the required property of the decline of the spectral density profile.

Figure 4:
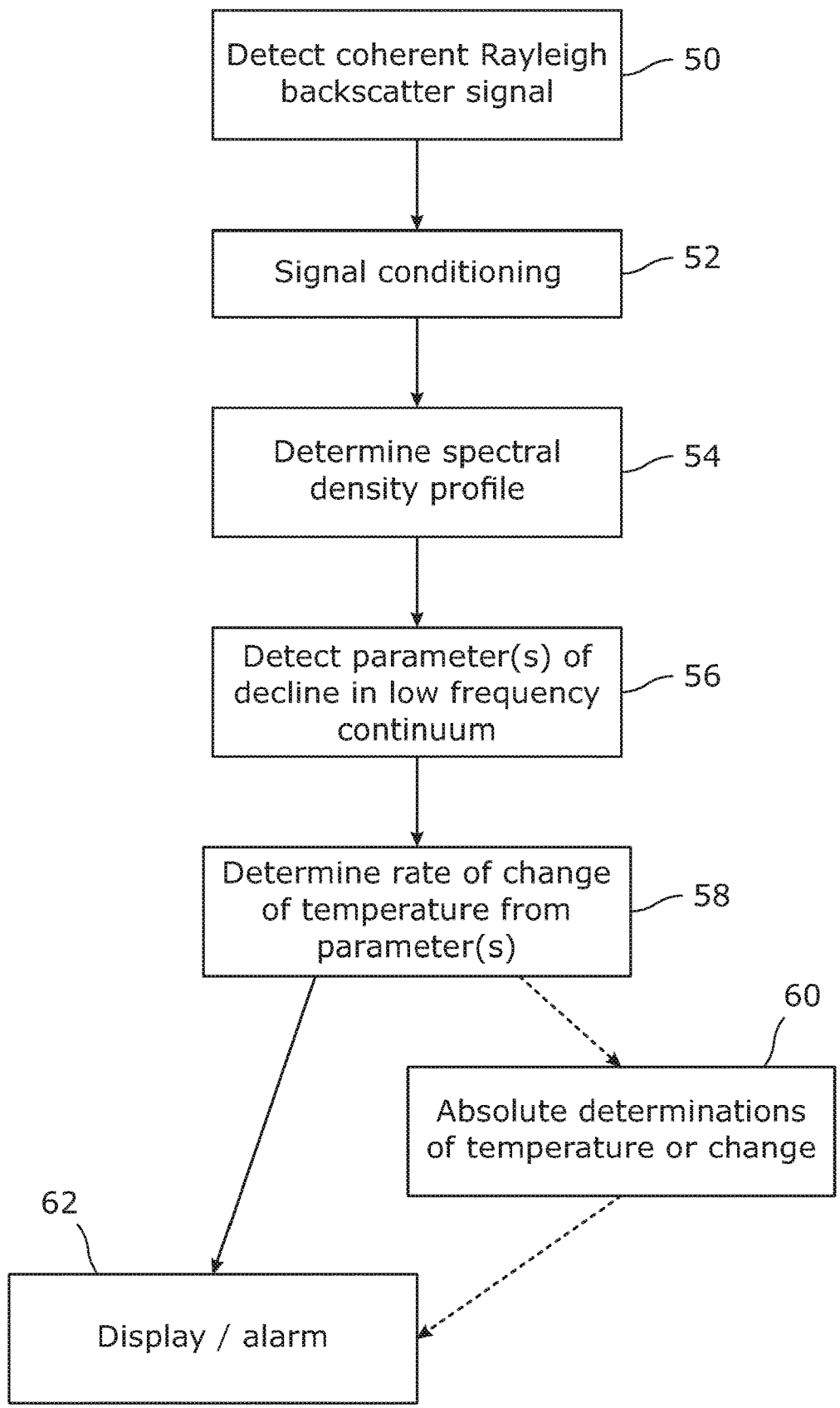
FIG. 4 shows steps of a method for implementing the invention.

More generally, step 56 of FIG. 4 may be carried out by detecting the decline in the spectral density profile, by determining one or more function parameters of a detection function applied to the spectral density profile, and determining the rate of change of temperature from the one or more determined function parameters. The above example of using a threshold is then a specific case in which the detection function comprises a threshold function for which a said function parameter specifies a frequency at which the spectral density profile declines past a threshold spectral density level. This threshold spectral density level can be set in various ways including providing a predetermined absolute value for a threshold spectral density value or specifying a spectral density value which is a predetermined fraction of or other function of the DC spectral density, or of some other property such as an average spectral density, in the same spectral density profile. Such thresholds could be based on DC and/or other levels of the same spectral density profile, or could also or instead use DC and/or other levels from other spectral density profiles, such as spectral density profiles from previous or nearby time windows and/or spatial locations, or longer term or wider spatial ranges of data for example from the whole sensing fibre and long term time averages.

The technique illustrated in FIG. 5 in which a tangent is found to a steepest part of the decline of the spectral density profile, for example by fitting a suitably shaped smooth curve, may be taken as a specific example of techniques involving fitting the above mentioned detection function to the spectral density profile to determine said one or more function parameters, for example where the detection function is a curve for fitting to a low frequency spectral continuum of the spectral density profile.

The declining spectral density profile, for example as shown in FIG. 5, may also be described as a DC peak in spectral density, since the spectral density generally declines from the DC value in the illustrated shoulder form, and suitable properties of the peak or shoulder for determining rate of change of temperature may include determining an envelope, contour or boundary of the DC peak.

Having detected one or more properties of a decline in the spectral density profile, these are used in step 58 of FIG. 4 to determine the required rate of change of temperature in the environment of the sensing optical fibre at the relevant position and time. For example, the frequency determined using either technique illustrated in FIG. 5 or discussed more generally above may be used in the equation (3) above, suitably calibrated if required to adjust for differences from the precise form and values in this equation for a particular sensor, to recover the rate of change of temperature. Such adjustments can easily be derived using a suitable calibration procedure, so that rate of change of temperature may be determined as a suitably calibrated straight line or curved function of a determined frequency at a threshold or other frequency level.

Having determined a rate of change of temperature at a particular position and time, this may be used in further process steps such as steps 60 and 62. Step 60 illustrates an integration step in which rate of change of temperature is integrated over time to estimate an absolute temperature change in a particular interval. Step 62 is a step in which an alarm, other warning, or simply a visual display of absolute or rate of temperature change is presented.

Figure 6A:
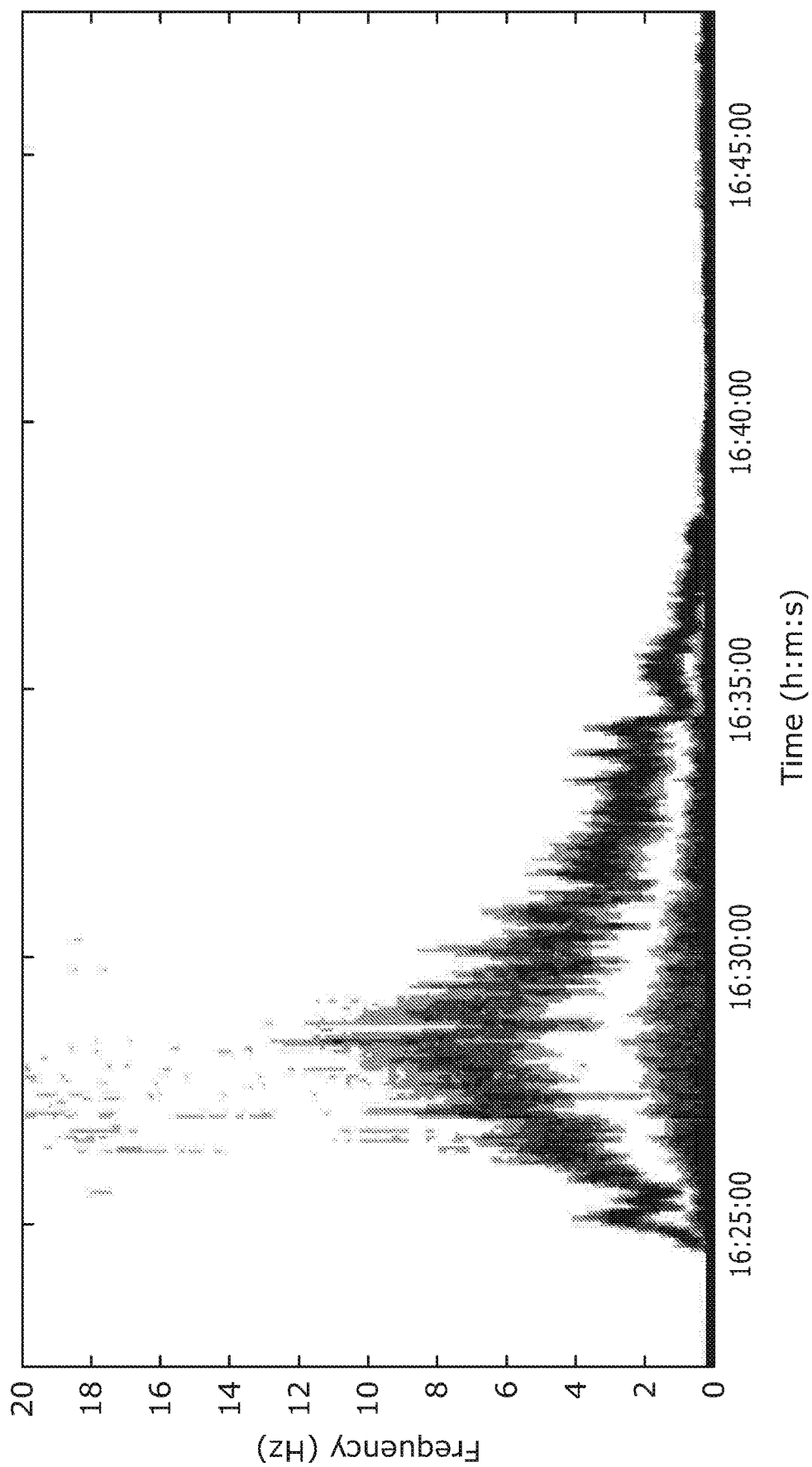
FIGS. 6a and 6b correspond to FIGS. 3a and 3b, but where probe light pulses each having two coherently interfering peaks are used.

The experiment providing the results presented in FIGS. 3a and 3b was repeated, but using probe light pulses 6' with double peak pulse shapes as already described above. The coherent Rayleigh backscatter interference signal output by the detector 16 over a broadly similar heating and cooling cycle to that already discussed above in respect of FIG. 3a is shown in FIG. 6a. In this case, the power spectral density at the downsampled rate was averaged over time bins of 4 seconds. Again, this plot takes the form of a spectrogram in which time over a total interval of about fifteen minutes provides the abscissa, and power spectral density corresponding to frequency components of the detected coherent Rayleigh backscatter interference signal provides the ordinate. The spectrogram therefore comprises a series of spectral density profiles 40, each such profile being calculated from coherent Rayleigh backscatter detected in a corresponding time window. The spectrogram also results from data processing largely as described above in respect of FIG. 3a.

It can be seen from FIG. 6a that the use of double peaked probe light pulses leads to a change on the form of the spectral density profile with increasing frequency, at each time point. Instead of the profile being in the form of a low frequency continuum declining from a substantially DC peak as seen in FIG. 3a, by using double peaked probe light pulses the profile now takes the form of noise, or a very abbreviate continuum, at around the DC level, and any case below around 2 Hz, and a clear peak which varies in position from close to the DC noise level up to about 8 Hz, with a full width at half maximum of the peak which is of the order of 0.5 Hz at smaller frequencies near to the DC noise, broadening to about 2 Hz at higher frequencies.

By way of explanation, it appears that when the probe light pulses are single peaked, the spectral density of the low frequency signal observed in FIG. 3a is filled between DC and an upper threshold frequency because of the continuous distribution of optical path-length differences within a particular region of the sensing optical fibre illuminated by a particular pulse and giving rise to a particular time-position spectral measurement in the coherent Rayleigh backscatter. Using a probe light pulse with two separated by coherent peaks restricts the range of optical path-length differences giving rise to the interference for a particular position and time to a much more limited range with a well-defined average.

Figure 6B:
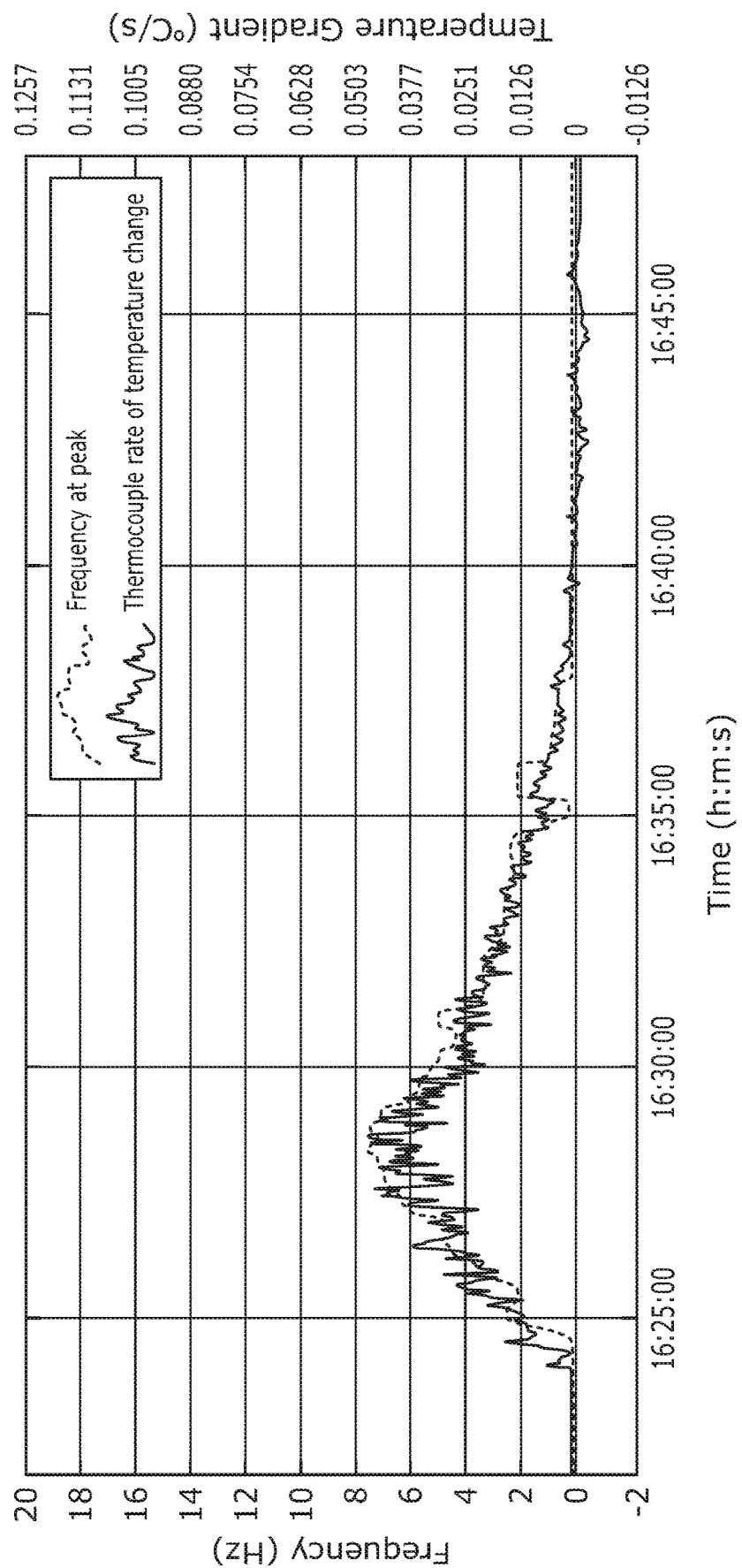

Importantly, the position of the peak in the spectral density plot of FIG. 6a corresponds at least broadly to the rate of change of temperature for the experiment as shown in FIG. 2. Similar to FIG. 3b, FIG. 6b provides as a more slowly varying line, the frequency in Hz of the non-DC peak in the power spectral density for each 4 second time window of the data of FIG. 6a, with the peak frequency values then smoothed by a 30 second window. For comparison, the more rapidly varying line shows the actual rate of change of temperature in the water bath at the fibre coil as determined by a local and suitably calibrated thermocouple. It can be seen that the non-DC peak of power spectral density follows the form of the curve representing rate of change of temperature well, subject to a suitable linear scaling, and is relatively easy and reliable to calculate from the coherent Rayleigh backscatter interference signal, without having to identify or track the frequency or phase of particular individual frequency components which might be thought to result from to a gradual temperature change.

The spectral peaks of the FIG. 6a data were detected using the following steps. A signal threshold of each time frame was estimated as two standard deviations above the mean spectral density in that time frame across all frequencies. This threshold was then applied to the spectral density profile for each timeframe after slight smoothing across frequencies using a 2 Hz window, to remove all signal below the threshold determined for that timeframe. The peak for a timeframe was then detected, after first reducing the values of the first few time bins closest to DC so as to improve the accuracy of the peak detection.

The teaching of FIG. 4 and the related discussion above about the processing of a raw coherent Rayleigh backscatter signal to derive a rate of change of temperature can also be applied to such signals arising from the use of double peaked probe light pulses such as those giving rise to the spectra of FIG. 3a. However, instead of providing various techniques for detecting a position of a decline in the spectral density, techniques for detecting a peak in the spectral density can be used instead, such that step 56 of FIG. 4 then represents the process of detecting one or more properties of a peak of the spectral density profile, and in particular a peak which is separate and distinct from any essentially DC peak as can be seen in FIG. 6a.

Various such techniques for detecting the position of a peak are available to the skilled person, but may include for example fitting a function or curve to the profile of which one or more fitting parameters can be used to calculate a peak or related frequency value, or to calculate more directly a parameter representing the desired rate of change of temperature. Such techniques may distinguish the target peak representing temperature changes in the environment of the fibre from noise or other low frequency signals around DC to 2 Hz, for example by seeking a peak which is separated or distinct from such a DC feature by at least a certain amount, for example using suitable curve fitting techniques, for example by seeking a peak which declines to at least 50% of the peak before reaching a low frequency level such as 1 Hz or DC in the spectral data. Other techniques may simply take a mean or average frequency spectral density profile, preferably after first excluding the low frequency or DC proximate signal seen in FIG. 6a, although even this exclusion this may in practice not be necessary.

The range of frequencies where a peak in the spectral density profiles may be expected to represent temperature changes in the environment of the sensing optical fibre may range, for example, from about 1 Hz to about 30 Hz, and methods and apparatus for implementing the invention may seek peaks in this range.

Figure 7:
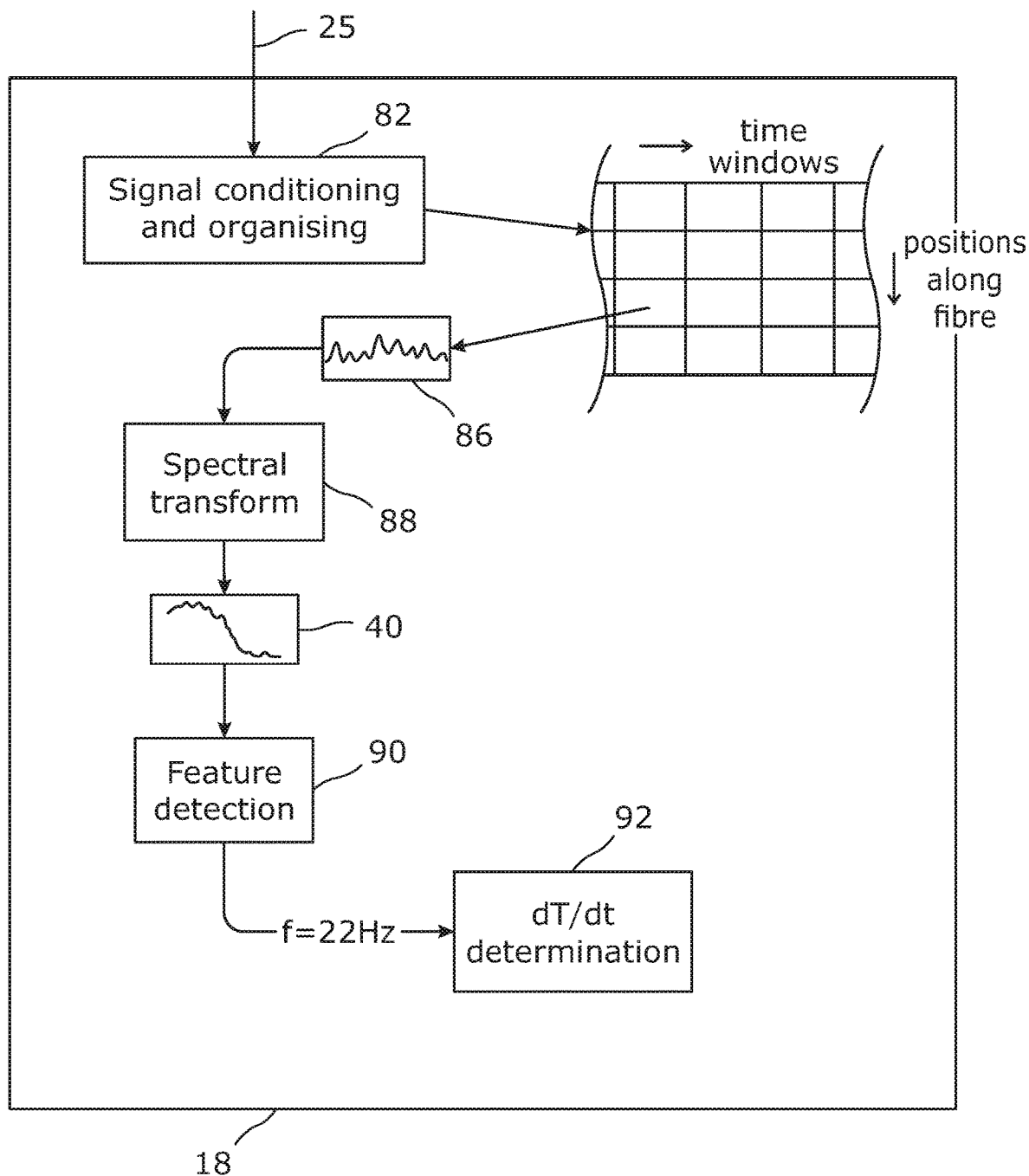
FIG. 7 illustrates in more detail aspects of the interrogator of FIG. 1 which may be used for implementing the invention.

More generally, the spectral density profiles of FIGS. 3a and 6a may take forms which comprise one or other or both of a peak, a decline, and indeed optionally other forms and features, which can be analysed in various ways such as by fitting of a function in order to determine a temperature or rate of change of temperature. In other words, the alternative features described herein of a decline in a low frequency spectral continuum where a single peaked probe light pulse is used, and a peak distinct from any DC peak in the spectral density function, may be taken as two specific examples of features which may be used for determination of rate of change of temperature in the environment of the sensing optical fibre FIG. 7 shows aspects of how the analyser 18 of FIG. 1 can be provided in order to implement the techniques illustrated in FIGS. 4 and 5 as discussed above, using any particular features of interest in the spectral density profiles. A signal conditioning element 82 is used to organise and condition the incoming coherent Rayleigh backscatter interference signal so as to organise the signal into a number of time windows and positions along the sensing optical fibre as shown in signal structure 84. A portion 86 of the conditioned coherent Rayleigh backscatter interference signal for a particular time window and position is then input to a spectral transform element 88, which could for example be provided by a fast Fourier transform function as discussed above, to output a spectral density profile 40 for that time window and position. A feature detection element 90 (for example either a decline detection element or a peak detection element) then processes the spectral density profile 40 to detect one or more properties of a feature such as a decline or peak with increasing frequency in the spectral density profile, for example using techniques described above in connection with step 56 of FIG. 4. These one or more properties, illustrated in FIG. 7 by a particular detected threshold or peak frequency f=22 Hz, are then passed to a temperature change determination element 92 for determining a rate of change of temperature for the associated time window and position, for example using techniques described above in connection with step 58 of FIG. 60.

Steps used by the described embodiments and corresponding elements of the analyser illustrated in FIGS. 4, 5 and 7 will typically be carried out using suitably programmed computer hardware. Such computer hardware may typically be provided by a computer processor and associated memory and other elements provided at an analyser unit 18 forming part of or closely associated with the other elements of the interrogator unit. However, the processing steps, software and computer elements may equally be provided by one or more computer elements provided at one or more other locations remote from the analyser. Although aspects of the embodiments have been illustrated for the purposes of clarity and explanation as forming a series of separate method steps or software function elements as illustrated in FIGS. 4, 5 and 7, such method steps and software function elements can of course be combined and provided in different combinations as desired by the particular implementation.

Figure 8:
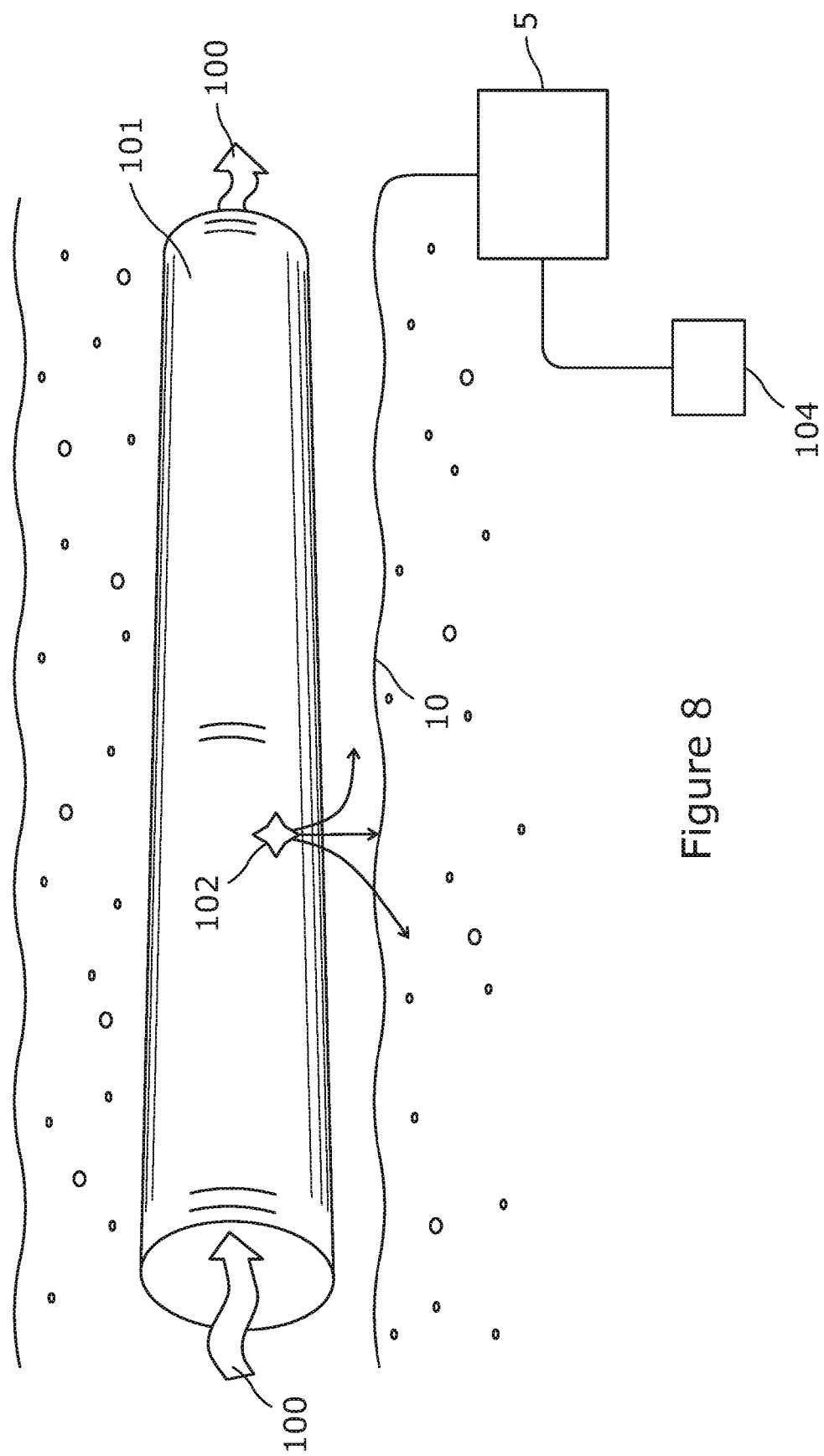
FIG. 8 shows an embodiment of the invention installed for detecting of leaks of fluid from a pipeline underground.

Embodiments of the invention may be used to detect rate of change of temperature in a variety of different situations and application areas. For example, as illustrated in FIG. 8 the sensing optical fibre 10 may be installed alongside a pipeline 101, for example buried alongside an underground pipeline, or installed proximally to or fitted to an underground or over ground pipeline. If fluid 100 passing along the pipeline, such as oil, gas or water, or a chemical product, leaks from the pipeline as shown here by leak 102, then various temperature changes may be seen, including a gradual temperature change in the ground surrounding or other environment around the pipeline due to a differential between temperature of the fluid in the pipeline and the pre-leak temperature of the environment, and/or from Joule-Thomson cooling as the fluid loses pressure through the leak 102. Using the distributed optical fibre sensing techniques described here, not only can temperature changes caused by the leak 102 be more reliably detected by the interrogator 5, the spatial profile and development of temperature changes along the sensing optical fibre 10 proximal to the leak 102 can be also be detected, enabling better characterisation of the detected signal and identification and categorisation of the leak 102. Such categorisation can for example be used to better decide automatically when to trigger an alarm 104.

Embodiments of the invention may similarly be used to measure temperature changes in wells and bores such as oil and gas wells, for example using optical fibre already installed in such bores, or optical fibre introduced for the purposes of distributed optical fibre sensing.

Other application areas include detection of temperature changes in a building or other structure for example due to fire, or resulting from cooling or heating of building for example under the influence of an air conditioning or heating system and other influences, and temperature changes distributed along a sensing optical fibre installed along path in a vehicle such as an aeroplane, ship, truck or car, or in a tank such as a water tank, a fuel tank or a gas tank.

Embodiments of the invention may also conveniently be used for detecting parameters and conditions in addition to the change in temperature described herein, including acoustic signals of various kinds and of various origins which impinge on the sensing optical fibre, as described for example in WO2012/063066 and WO2012/076873 mentioned above.

Although specific embodiments of the invention have been described with reference to the drawings, the skilled person will be aware that variations and modifications may be applied to these embodiments without departing from the scope of the invention defined in the claims.

The invention claimed is:

1. A method of detecting a rate of change of temperature in the environment of a sensing optical fibre, comprising:
    delivering probe light pulses into a sensing optical fibre disposed within the environment, each probe light pulse comprising two sections of higher intensity spaced apart by a section of lower or substantially zero intensity, the two sections of higher intensity being substantially coherent with each other; and
    for each of a plurality of positions along the sensing optical fibre:
        detecting a time varying coherent Rayleigh backscatter interference signal from probe light backscattered within the sensing fibre from the associated position;
        calculating a spectral density profile of the time varying coherent Rayleigh backscatter interference signal, the spectral density profile representing frequency components in the time variations of the coherent Rayleigh backscatter interference signal at that position;

detecting one or more properties of a spectral peak in the spectral density profile; and determining a rate of change of temperature in the environment of the sensing optical fibre at that position from the one or more properties of the spectral peak.

2. The method of claim 1 wherein the one or more properties of the spectral peak comprise a position of the spectral peak in the spectral density profile.

3. The method of claim 1 wherein detecting one or more properties of the spectral peak in the spectral density profile comprises determining one or more function parameters of a detection function applied to the spectral density profile, and determining the rate of change of temperature comprises determining the rate of change of temperature from the one or more determined function parameters.

4. The method of claim 3 wherein the detection function is a curve suitable tor fitting to the peak in the spectral density profile.

5. The method of claim 1 wherein the spectral density profile includes frequency components in the time varying coherent Rayleigh backscatter interference signal at least in the range from 1 Hz to 30 Hz.

6. The method of claim 1 wherein the detected one or more properties of a spectral peak in the spectral density profile comprise a detected frequency of the spectral peak in the range from 1 Hz to 30 Hz.

7. The method of claim 6 wherein the determined rate of change of temperature is proportional or monotonically related to the detected frequency at least in the range from 1 Hz to 30 Hz.

8. The method of claim 1 wherein calculation of a spectral density profile, detecting of one or more properties of a spectral peak in the spectral density profile, and determining a rate of change of temperature, is repeated for one or more of said plurality of positions at a rate of at least once every 60 seconds.

9. The method of claim 1 wherein the two sections of higher intensity of each probe light pulse are separate but mutually coherent intensity peaks.

10. The method of claim 1 wherein each section of higher intensity of each probe light pulse is a peak of the probe light pulse, and: each peak occupies from 5% to 40% of the duration of the pulse; each peak is of similar intensity being within 10% of each other; and the section of low intensity between the peaks has an intensity of less than 30% of the intensity at each peak.

11. The method of claim 1 wherein each probe light pulse has a duration in the range 20 to 500 nanoseconds.

12. The method of claim 1 wherein the position of the spectral peak in the spectral density profile represents the rate of change of temperature in the environment of the sensing optical fibre.

13. The method of claim 1 wherein the sensing optical fibre is installed alongside an underground pipeline, for detecting leaks of fluid from the pipeline.

14. Apparatus for detecting a rate of change of temperature in the environment of a sensing optical fibre, comprising:

a sensing optical fibre disposed in the environment;

a probe light source arranged to deliver probe light pulses into the sensing optical fibre, each probe light pulse comprising two sections of higher intensity spaced apart by a section of lower or substantially zero intensity, the two sections of higher intensity being substantially coherent with each other;

a detector arranged to detect a time varying coherent Rayleigh backscatter interference signal for each of a plurality of positions along the sensing optical fibre from probe light backscattered within the sensing fibre from the corresponding positions; and an analyser arranged to carry out, for each of a plurality of positions along the sensing optical fibre, steps of calculating a spectral density profile of the time varying coherent Rayleigh backscatter interference signal, the spectral density profile representing frequency components in the time variations of the coherent Rayleigh backscatter interference signal at that position, detecting one or more properties of a spectral peak in the spectral density profile, and determining a rate of change of temperature in the environment of the sensing optical fibre at that position from the one or more properties of the spectral peak.

15. The apparatus of claim 14 further comprising an alarm, the apparatus being arranged to operate the alarm responsive to the determined rate of change of temperature at one or more of the plurality or positions.

16. The apparatus of claim 14 wherein the two sections of higher intensity of each probe light pulse are separate but mutually coherent intensity peaks.

17. The apparatus of claim 14 wherein each section of higher intensity of each probe light pulse is a peak of the probe light pulse, and: each peak occupies from 5% to 40% of the duration of the pulse; each peak is of similar intensity being within 10% of each other; and the section of low intensity between the peaks has an intensity of less than 30% of the intensity at each peak.

18. The apparatus of claim 14 wherein each probe light pulse has a duration in the range 20 to 500 nanoseconds.

19. The apparatus of claim 14 wherein the one or more properties of the spectral peak comprise a position of the spectral peak in the spectral density profile.

20. The apparatus of claim 14 wherein the position of the spectral peak in the spectral density profile represents the rate of change of temperature in the environment of the sensing optical fibre.

21. The apparatus of claim 14 wherein detecting one or more properties of the spectral peak in the spectral density profile comprises determining one or more function parameters of a detection function applied to the spectral density profile, and determining the rate of change of temperature comprises determining the rate of change of temperature from the one or more determined function parameters.

22. The apparatus of claim 21 wherein the detection function is a curve suitable for fitting to the peak in the spectral density profile.

23. The apparatus of claim 14 wherein the spectral density profile includes frequency components in the time varying coherent Rayleigh backscatter interference signal at least in the range from 1 Hz to 30 Hz.

24. The apparatus of claim 14 wherein the detected one or more properties of the spectral peak in the spectral density profile comprise a detected frequency of the spectral peak in the range from 1 Hz to 30 Hz.

25. The apparatus of claim 24 wherein the determined rate of change of temperature is proportional or monotonically related to the detected frequency at least in the range from 1 Hz to 30 Hz.

26. The apparatus of claim 14 wherein calculation of a spectral density profile, detecting of one or more properties of a spectral peak in the spectral density profile, and determining a rate of change of temperature, is repeated for one or more of said plurality of positions at a rate of at least once every 60 seconds.

27. The apparatus of claim 14 wherein the sensing optical fibre is installed alongside an underground pipeline, for detecting leaks of fluid from the pipeline.

28. A method for detecting a rate of change of temperature in an environment of a sensing optical fibre, by detecting a spectral peak of a low frequency signal in a coherent Rayleigh backscatter signal received from the sensing optical fibre, and determining the rate of change of temperature from one or more properties of the spectral peak, wherein the spectral peak arises from delivering probe light pulses into the sensing optical fibre such that each probe light pulse comprises two sections of higher intensity spaced apart by a section of lower or substantially zero intensity, the two sections of higher intensity being substantially coherent with each other.

29. The method of claim 28 wherein the spectral peak moves in response to the rate of change of temperature to be detected.

30. The method of claim 28 wherein the rate of change of temperature is determined as a function of time from the time dependence of the spectral peak.

* * * * *